United States Patent
Kumaki et al.

(10) Patent No.: US 7,634,815 B2
(45) Date of Patent: Dec. 15, 2009

(54) SIGNAL GENERATOR PROVIDED WITH LICENSE CONTROL FUNCTION AND LICENSE CONTROL METHOD THEREOF

(75) Inventors: Akihisa Kumaki, Hiratsuka (JP); Tatsuro Hanaya, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 833 days.

(21) Appl. No.: 10/547,994

(22) PCT Filed: Feb. 8, 2005

(86) PCT No.: PCT/JP2005/001845

§ 371 (c)(1),
(2), (4) Date: Sep. 8, 2005

(87) PCT Pub. No.: WO2005/076141

PCT Pub. Date: Aug. 18, 2005

(65) Prior Publication Data

US 2006/0200512 A1   Sep. 7, 2006

(30) Foreign Application Priority Data

Feb. 10, 2004 (JP) ............................. 2004-033574

(51) Int. Cl.
*G06F 7/04* (2006.01)
(52) U.S. Cl. ................. 726/26; 726/2; 726/4; 713/168; 713/182; 380/2
(58) Field of Classification Search .................... 726/26, 726/2, 4, 17, 27; 708/270, 708; 713/168, 713/182; 380/2; 705/57, 59, 67
See application file for complete search history.

(56) References Cited

U.S. PATENT DOCUMENTS 5,001,660 A     3/1991   Adcock et al.

FOREIGN PATENT DOCUMENTS

JP          3-1705 A       1/1991

(Continued)

OTHER PUBLICATIONS

An English Translation of JP 2002-0921449.*

(Continued)

*Primary Examiner*—Kimyen Vu
*Assistant Examiner*—Baotran N To
(74) *Attorney, Agent, or Firm*—Frishauf, Holtz, Goodman & Chick, P.C.

(57) ABSTRACT

A signal generator has a signal creating and supplying unit which creates a test signal to be transmitted to a measurement object and a license management unit which manages a license of waveform data for use in creating the test signal by the signal creating and supplying unit. The license management unit includes a waveform data memory which stores a plurality of waveform data files, a usable file list taking unit which takes a usable file list for specifying a usable waveform data file authenticated for the signal generator, the usable file list being input from an outside section, a usable file list memory which stores the usable file list, a determining unit which determines whether or not a desired waveform data file is included in the usable file list stored in the usable file list memory, and a waveform data file reading and transferring unit which reads the specified waveform data file from the waveform data memory and transfers the specified waveform data file to the signal creating and supplying unit when the determining unit determines in the affirmative.

16 Claims, 6 Drawing Sheets

Waveform data file information memory 20

| Pattern | Package | Version |
|---|---|---|
| • Test Mode 01 | W-CDMA | Ver 00.00 |
| • Test Mode 02 | W-CDMA | Ver 01.01 |
| • Test Mode 03 | W-CDMA | Ver 01.00 |
| • Test Mode 04 | W-CDMA | Ver 01.04 |
| • Test Mode 05 | W-CDMA | Ver 02.03 |
| • Test Mode 06 | W-CDMA | Ver 02.05 |
| • Test Mode 07 | W-CDMA | Ver 02.05 |
| • Test Mode 08 | W-CDMA | Ver 03.00 |
| • Test Mode 09 | W-CDMA | Ver 03.02 |
| • Test Mode 10 | W-CDMA | Ver 04.00 |
| • Test Mode 11 | W-CDMA | Ver 04.00 |
| • Test Pattern type A | GSM | Ver 01.00 |
| • Test Pattern type B | GSM | Ver 01.03 |
| • Test Pattern type C | GSM | Ver 02.01 |
| ⋮ | ⋮ | ⋮ |

FOREIGN PATENT DOCUMENTS

| | | |
|---|---|---|
| JP | 08-297698 A | 11/1996 |
| JP | 2002-91449 A | 3/2002 |
| JP | 2002-268762 A | 9/2002 |

OTHER PUBLICATIONS

An English Translation of JP 2002-268762.*

"3GPP TS 25.141 V5.7.0 (Jun. 2003)", [online], 2003.6, 3GPP Organizational Partners, 3$^{RD}$ Generation Partnership Project; Technical Specification Group Radio Access Network; Base Station (BS) conformance testing (FDD) (Release 5) pp. 110-113, [retrieved on Apr. 26, 2005], Retrieved from the Internet: <URL:http://www.3gpp.org/ftp/Specs/archive/25_series/25.141/25141_570.zip>.

Notification Concerning Transmittal of International Preliminary Report on Patentability and Written Opinion, Chapter I of the Patent Cooperation Treaty for PCT/JP2005/001845, 6 sheets.

* cited by examiner

FIG. 1

Waveform data file information memory 20

| Pattern | Package | Version |
|---|---|---|
| · Test Mode 01 | W-CDMA | Ver 00.00 |
| · Test Mode 02 | W-CDMA | Ver 01.01 |
| · Test Mode 03 | W-CDMA | Ver 01.00 |
| · Test Mode 04 | W-CDMA | Ver 01.04 |
| · Test Mode 05 | W-CDMA | Ver 02.03 |
| · Test Mode 06 | W-CDMA | Ver 02.05 |
| · Test Mode 07 | W-CDMA | Ver 02.05 |
| · Test Mode 08 | W-CDMA | Ver 03.00 |
| · Test Mode 09 | W-CDMA | Ver 03.02 |
| · Test Mode 10 | W-CDMA | Ver 04.00 |
| · Test Mode 11 | W-CDMA | Ver 04.00 |
| · Test Pattern type A | GSM | Ver 01.00 |
| · Test Pattern type B | GSM | Ver 01.03 |
| · Test Pattern type C | GSM | Ver 02.01 |
| ⋮ | ⋮ | ⋮ |

FIG. 2

Usable file list 21

| Pattern | Package | Version |
|---|---|---|
| · Test Mode 01 | W-CDMA | Ver 00.00 |
| · Test Mode 02 | W-CDMA | Ver 02.01 |
| · Test Mode 03 | W-CDMA | Ver 03.00 |
| · Test Mode 04 | W-CDMA | Ver 02.02 |
| · Test Mode 05 | W-CDMA | Ver 02.03 |
| ⋮ | ⋮ | ⋮ |

| Equipment type MG301 | | Manufacture serial number 123456 | | |
|---|---|---|---|---|
| Already bought | Version up grade | Pattern | Package | Version |
| ■ | ☐ | Test Mode 2 | W-CDMA | 01.01 |
| ■ | ■ | Test Mode 3 | W-CDMA | 03.00 |
| ☐ | ■ ~ 24 | Test Mode 4 | W-CDMA | 02.02 |
| ☐ | ☐ ~ 24 | Test Mode 5 | W-CDMA | 02.03 |
| ■ | ☐ | Test Mode 6 | W-CDMA | 02.05 |
| ☐ | ☐ | Test Mode 7 | W-CDMA | 02.05 |
| ⋮ | ⋮ | ⋮ | ⋮ | ⋮ |

SIGNAL GENERATOR PROVIDED WITH LICENSE CONTROL FUNCTION AND LICENSE CONTROL METHOD THEREOF

This application is a U.S. National Phase Application under 35 USC 371 of International Application PCT/JP2005/001845 filed Feb. 8, 2005.

1. Technical Field

The present invention relates to a signal generator having a license management function and its license management method, and particularly to a signal generator having a function, which is incorporated in various types of signal generators, of managing a license of waveform data of a test signal to be transmitted from the signal generator to a measurement object and its license management method.

2. Background Art

In a test to measurement objects such as various information communication equipments built into an information communication system, and further in a test on various optical communication equipments built into an optical communication system, etc, the measurement items of a test on the above one measurement object are in a wide range, in such a test as a test on each mobile station in a mobile communication system like a mobile cellular phone, a personal handyphone system (PHS), and the like.

Further, there are many cases where the measurement conditions and the measurement parameters are particularly defined as the test standard also about each measurement item of these tests.

In the case of a mobile cellular phone, there is a necessity of performing a communication test in different communication systems, specifically, in Wideband Code Division Multiple Access (W-CDMA) and Global System for Mobile Communication (GSM).

For example, in the case of a test of reference measurement channels in a mobile cellular phone of the W-CDMA method, parameters and the like necessary for a test is standardized by the following non-patent document 1.

Non-patent document 1: 3GPP TS 25.141 V5.7.0 (2003-6) pp. 110-113.

Further, in a test of the communication system of this kind, a measuring device necessary for every item of the test is previously defined.

For example, the measuring instrument necessary for a response test in a mobile cellular phone, PHS, and the like includes a signal generator which transmits a test signal to a measurement object such as a mobile cellular phone, PHS, and the like, a spectrum analyzer which measures the frequency characteristic of a response signal from the measurement object, and the like.

Accordingly, a person carrying out a test has to set the measurement conditions and the measurement parameters for every measurement item of the test every time one measurement is finished, which is very troublesome for the person carrying out the test.

In particular, it is necessary to particularly transmit various kinds of test signals corresponding to the measurement conditions and measurement parameters previously standardized, for example, to the measurement object such as the mobile cellular phone, the PHS, and the like, from the signal generator.

Accordingly, in this case, in order to realize the signal waveform in various kinds of test signals corresponding to the measurement conditions and the measurement parameters, the person carrying out the test has to set the waveform data corresponding to each signal waveform in each measuring instrument.

The task of setting the various waveform data in a memory of each measuring instrument, however, is very troublesome for the person carrying out the test, taking much time, with a high possibility of erroneous setting occurring.

Figure 9:
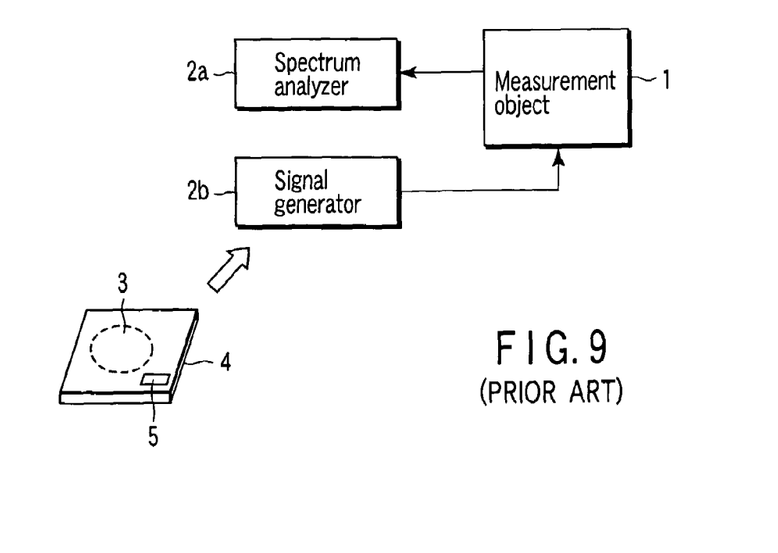
FIG. 9 is a schematic view for describing a waveform data management method of a conventional measuring device.

In order to avoid this disadvantage, a test system as shown in FIG. 9 has been proposed heretofore.

Namely, in this test system, of the various measuring instruments such as a spectrum analyzer 2a, a signal generator 2b, and the like, with respect to, for example, the signal generator 2b, a manufacture maker of the measuring instrument is to provide a user who bought this measuring instrument (signal generator 2b) with various kinds of waveform data for realizing a test signal corresponding to the measurement conditions and the measurement parameters written to, for example, a compact disc-read only memory (CD-ROM) 3 with charge.

Accordingly, the manufacture maker of the measuring instrument has to perform a license management so that the waveform data is not used for the other measuring instrument (signal generator 2b) without permission.

A general license management method of software is to write an inherent install key as well as various waveform data into the CD-ROM 3 and to attach a label representing an install key 5 to a case 4 of the CD-ROM 3.

At a time of installing the various waveform data into the signal generator (measuring instrument) 2b which a user is permitted to use, it is confirmed that an install key 6 input by an operator (person carrying out the test) agrees with the install key written into the CD-ROM 3.

A method of license management of this installed software is disclosed in the following patent document 1.

Patent document 1: Jpn. Pat. Appln. KOKAI Publication No. 8-297698

In the license management method of the installed software disclosed in this patent document 1, when the number of execution times of installation of the software into a computer is beyond the predetermined number of times, a computer is to display to the effect that an information fee collecting service is called up and the information fee collecting service is to collect the information fee, upon receipt of a call, at a time of accepting the install key.

The above method of license management of the waveform data by use of the install key, however, has the following problem to be solved.

Namely, the CD-ROM 3 into which the waveform data after installed is written is kept inside the case 4 with the label of the install key 5 attached.

Accordingly, since it can be easily installed into another signal generator (measuring instrument) 2b in which the use of the waveform data is not permitted, the license management of the waveform data is not enough for a manufacture maker of measuring instruments.

Namely, the manufacture maker of measuring instruments which provides users with the waveform data with charge cannot assure the license fee fully and cannot perform the proper version management for each user.

DISCLOSURE OF INVENTION

Taking the above situation into consideration, an object of the invention is to provide a signal generator having a license management function capable of decreasing the burden on an operator and assuring the license management of the waveform data and its license management method, thereby incorporating a license management function in the signal generator itself, hence to assure a license agreement for each signal generator.

In order to achieve the above-described object, according to a first aspect of the present invention, there is provided a signal generator having a license management function, comprising: a signal creating and supplying unit (11) which creates a test signal to be transmitted to a measurement object (1); and a license management unit (12) which manages a license of waveform data used in creating the test signal by the signal creating and supplying unit (11), characterized in that the license management unit (12) comprises: a waveform data memory (18) which stores a plurality of waveform data files (19) into which a plurality of waveform data for various tests is written; a usable file list taking unit (26) which takes a usable file list (21) for specifying a usable waveform data file authenticated for the signal generator, the usable file list being input from an outside section; a usable file list memory (29) which stores the usable file list (21) taken by the usable file list taking unit (26); a utilization file specifying unit (34) which specifies a desired waveform data file from the plurality of waveform data files (19) stored in the waveform data memory (18); a determining unit (30) which determines whether or not the desired waveform data file specified by the utilization file specifying unit (34) is included in the usable file list stored in the usable file list memory (29); and a waveform data file reading and transferring unit (36) which reads a specified waveform data file (19) from the waveform data memory (18) and transfers the specified waveform data file to the signal creating and supplying unit (11) when the determining unit (30) determines that the desired waveform data file is included in the usable file list memory (29), wherein the signal creating and supplying unit (11) creates a predetermined test signal according to the waveform data read from the specified waveform data file (19) transferred by the waveform data file reading and transferring unit (36) and transmits the predetermined test signal to the measurement object (1).

In the signal generator having the license management function thus constituted, a manufacture maker of the signal generator sells the signal generator to a user with a plurality of waveform data files including each waveform data written in the waveform data memory of the signal generator without charge or after selling it, the manufacture maker provides a user with the waveform data file with the waveform data written without charge in response to the user's request.

The manufacture maker of the signal generator selling the signal generator provides the user of the signal generator with a usable file list to specify a usable waveform data file for the corresponding signal generator, with charge, in every signal generator.

The user of the signal generator inputs the usable file list provided with charge into the corresponding signal generator.

Thereafter, when the user of the signal generator specifies the operation for his or her desired waveform data file, if the specified waveform data file is included in the usable file list, the corresponding desired waveform data file is read from a waveform data memory and transferred to a test signal creating and supplying unit, and as a result, a test signal having the waveform using the waveform data of the desired waveform data file is transmitted from the signal generator to the measurement object.

Thus, as long as the respective data files written in the waveform data memories of the respective signal generators without charge are not included in the usable file list provided to each corresponding signal generator with charge, since they are not read, the manufacture maker of the signal generator can surely conduct the license management of the respective waveform data (respective waveform data files).

In order to achieve the above-described object, according to a second aspect of the present invention, there is provided the signal generator having the license management function according to the first aspect, characterized in that the plurality of waveform data files (19) stored in the waveform data memory (18) each has a version, a usable version is registered in the usable file list (21) stored in the usable file list memory (29) according to the usable waveform data file (19) authenticated for the signal generator, and when the version of the specified waveform data file (19) specified by the utilization file specifying unit (34) is equal to or smaller than the usable version for the same waveform data file (19) registered in the usable file list (21), the determining unit determines that the specified waveform data file (19) is included in the usable file list stored in the usable file list memory (29).

In the signal generator having the license management function thus constituted, the respective waveform data files of the waveform data memories and the respective usable files of the usable file list are provided with the respective versions, and therefore, even if they are the same kind of waveform data file each other, the waveform data file of the latest version (the largest value of the version) can collect the additional fee of use and the license management as for the respective waveform data (respective data files) as well as the version management can be surely conducted.

In order to achieve the above-described object, according to a third aspect of the present invention, there is provided the signal generator having the license management function according to the first aspect, characterized in that the usable file list (21) taken by the usable file list taking unit (26) has been encoded previously with inherent information in the signal generator, and the signal generator further comprises a decoding unit (27) which decodes an encoded usable file list (21) by using the inherent information in the signal generator and writes a decoded usable file list (21) in the usable file list memory (29).

In the signal generator having the license management function thus constituted, since the usable file list provided from the manufacture maker of signal generators with charge is encoded with the inherent information in the signal generator of a user of the provision destination, only when this usable file list is input into the signal generator of the user of the provision destination can it be decoded with the inherent information in the corresponding signal generator.

Therefore, even when this usable file list is input into another signal generator, it cannot be decoded, thereby much further improving the security of the usable file list.

In order to achieve the above-described object, according to a fourth aspect of the present invention, there is provided the signal generator having the license management function according to the third aspect, characterized in that when the inherent information in the signal generator is a manufacture serial number of the signal generator, the signal generator further comprises a manufacture serial number memory (28) which stores the manufacture serial number of the signal generator, and the decoding unit (27) decodes the encoded usable file list (21) by using the manufacture serial number of the signal generator read from the manufacture serial number memory (28).

In the signal generator having the license management function thus constituted, since the usable file list provided with charge from the manufacture maker of signal generators is encoded with the manufacture number of the signal generator of the user of the provision destination, only when this usable file list is input into the signal generator of the user of the provision destination can it be decoded with the manufacture serial number of the corresponding signal generator.

Therefore, even when this license file list is input into another signal generator, it cannot be decoded, thereby much further improving the security of the usable file list.

In order to achieve the above-described object, according to a fifth aspect of the present invention, there is provided the signal generator having the license management function according to the third aspect, characterized in that the encoded usable file list (21) is downloaded into the signal generator from a site of a manufacture maker of signal generators with charge through a network.

In the signal generator having the license management function thus constituted, by downloading the encoded usable file list from the site of the manufacture maker of signal generators through the network, the manufacture maker of signal generators and a user of the signal generator can perform various services very efficiently.

In order to achieve the above-described object, according to a sixth aspect of the present invention, there is provided the signal generator having the license management function according to the third aspect, characterized in that the encoded usable file list (21) is downloaded into the signal generator through a storage medium provided by a manufacture maker of signal generators with charge.

In the signal generator having the license management function thus constituted, by downloading the encoded usable file list through the storage medium provided from the manufacture maker of signal generators, the manufacture maker of signal generators and the user of the signal generator can perform various services very efficiently.

In order to achieve the above-described object, according to a seventh aspect of the present invention, there is provided the signal generator having the license management function according to the first aspect, characterized in that the waveform data file (19) stored in the waveform data memory (18) is downloaded from a site of a manufacture maker of signal generators through a network without charge.

In the signal generator having the usable file list thus constituted, by downloading the respective waveform data files from the site of the manufacture maker of signal generators through the network, the manufacture maker of signal generators and the user of the signal generator can perform various services very efficiently.

In order to achieve the above-described object, according to an eighth aspect of the present invention, there is provided the signal generator having the license management function according to the first aspect, characterized by further comprising: a detail display unit (36*a*) which displays detailed information of the waveform data read from the waveform data file (19) transferred by the waveform data file reading and transferring unit (36).

In the signal generator having the license management function thus constituted, since the detailed information of the waveform data read from the waveform data file transferred by the waveform data file reading and transferring unit is displayed, the user of the signal generator can perform various services very efficiently.

In order to achieve the above-described object, according to a ninth aspect of the present invention, there is provided the signal generator having the license management function according to the first aspect, characterized by further comprising: a list display instructing unit (33*a*) for instructing a list display of titles of the waveform data files (19) stored in the waveform data memory (18); and a list display unit (18*a*) which displays a list of the tiles of the waveform data files (19) stored in the waveform data memory (18), in response to an instruction by the list display instructing unit (33*a*).

In the signal generator having the license management function thus constituted, since the titles of the waveform data files stored in the waveform data memory are listed and displayed on the list display unit in response to the instruction by the list display instructing unit, the user of the signal generator can perform various services very efficiently.

In order to achieve the above-described object, according to a tenth aspect of the present invention, there is provided the signal generator having the license management function according to the first aspect, characterized in that at least one of a W-CDMA transmission test data package and a GSM transmission test data package is included in the waveform data files (19) stored in the waveform data memory (18).

In the signal generator having the license management function thus constituted, since the waveform data file stored in the waveform data memory includes at least one of the W-CDMA transmission test data package and the GSM transmission test data package, the user of the signal generator can perform various services very efficiently.

In order to achieve the above-described object, according to an eleventh aspect of the present invention, there is provided a license management method of a signal generator, comprising: a step for preparing a signal creating and supplying unit (11) which creates a test signal to be transmitted to a measurement object (1); and a step for managing a license of waveform data used in creating the test signal by the signal creating and supplying unit (11), characterized in that the managing step comprises: a step for storing in a waveform data memory (18) a plurality of waveform data files (19) into which a plurality of waveform data for various tests is written; a step for taking a usable file list (21) which specifies a usable waveform data file authenticated for the signal generator; a step for storing the usable file list (21) taken by the taking step in a usable file list memory (29); a step for specifying a desired waveform data file from the plurality of waveform data files (19) stored in the waveform data memory (18); a step for determining whether or not the desired waveform data file specified by the specifying step is included in the usable file list stored in the usable file list memory (29); and a step for reading a specified waveform data file (19) specified by the specifying step from the waveform data memory (18) and transferring the specified waveform data the file (19) to the signal creating and supplying unit (11) when it is determined that the desired waveform data file is included in the usable file list memory (29) in the determining step, and wherein the signal creating and supplying unit (11) creates a predetermined test signal according to the waveform data read from the specified waveform data file (19) transferred by the transferring step and transmits the predetermined test signal to the measurement object (1).

Also in the license management method of the signal generator according to the eleventh aspect thus constituted and in the license management method of the signal generator according to the twelfth to the twentieth aspects described below, the same function and effect can be achieved as the signal generator having the license management function according to the above-mentioned first to tenth aspects.

In order to achieve the above-described object, according to a twelfth aspect of the present invention, there is provided the license management method of the signal generator according to the eleventh aspect, characterized in that the plurality of waveform data files (19) stored in the waveform data memory (18) each has a version, a usable version is registered in the usable file list (21) stored in the usable file list memory (29) according to the usable waveform data file (19) authenticated for the signal generator, and when the version of the specified waveform data file (19) specified by the specifying step is equal to or smaller than the usable version for the same waveform data file (19) registered in the usable file list (21), it is determined by the determining step that the specified waveform data file (19) is included in the usable file list stored in the usable file list memory (29).

In order to achieve the above-described object, according to a thirteenth aspect of the present invention, there is provided the license management method of the signal generator according to the eleventh aspect, characterized in that the usable file list (21) taken by the taking step has been encoded previously with inherent information in the signal generator, and the license management method of the signal generator further comprises a step for decoding an encoded usable file list (21) with the inherent information in the signal generator and writing a decoded usable file list in the usable file list memory (29).

In order to achieve the above-described object, according to a fourteenth aspect of the present invention, there is provided the license management method of the signal generator according to the thirteenth aspect, characterized in that when the inherent information in the signal generator is a manufacture serial number of the signal generator, the license management method of the signal generator further comprises a step for storing the manufacture serial number of the signal generator in the manufacture serial number memory (28), and in the decoding step, the encoded usable file list (21) is decoded by using the manufacture serial number of the signal generator read from the manufacture serial number memory (28).

In order to achieve the above-described object, according to a fifteenth aspect of the present invention, there is provided the license management method of the signal generator according to the thirteenth aspect, characterized in that the encoded usable file list (21) is downloaded into the signal generator from a site of a manufacture maker of signal generators with charge through a network.

In order to achieve the above-described object, according to a sixteenth aspect of the present invention, there is provided the license management method of the signal generator according to the thirteenth aspect, characterized in that the encoded usable file list (21) is downloaded into the signal generator through a storage medium provided by a manufacture maker of signal generators with charge.

In order to achieve the above-described object, according to a seventeenth aspect of the present invention, there is provided the license management method of the signal generator according to the eleventh aspect, characterized in that the waveform data file (19) stored in the waveform data memory (18) is downloaded from the site of a manufacture maker of signal generators through a network without charge.

In order to achieve the above-described object, according to an eighteenth aspect of the present invention, there is provided the license management method of the signal generator according to the eleventh aspect, characterized by further comprising: a step for displaying detailed information of the waveform data read from the waveform data file (19).

In order to achieve the above-described object, according to a nineteenth aspect of the present invention, there is provided the license management method of the signal generator according to the eleventh aspect, characterized by further comprising: a step for instructing a list display of titles of the waveform data files (19) stored in the waveform data memory (18); and a step for displaying a list of the tiles of the waveform data files (19) stored in the waveform data memory (18), in response to an instruction of the list display.

In order to achieve the above-described object, according to a twentieth aspect of the present invention, there is provided the license management method of the signal generator according to the eleventh aspect, characterized in that at least one of a W-CDMA transmission test data package and a GSM transmission test data package is included in the waveform data files (19) stored in the waveform data memory (18).

In the signal generator having the license management function according to the first to tenth aspects of the invention constituted as mentioned above and in the license management method of the signal generator according to the eleventh to twentieth aspects, by providing the signal generator itself with the license management function, the license agreement can be surely conducted about each of the signal generators, an operator's burden can be decreased, and the license management of the waveform data can be surely performed.

BEST MODE FOR CARRYING OUT THE INVENTION

Hereinafter, each embodiment of the invention will be described by using the drawings.

First Embodiment

Figure 1:
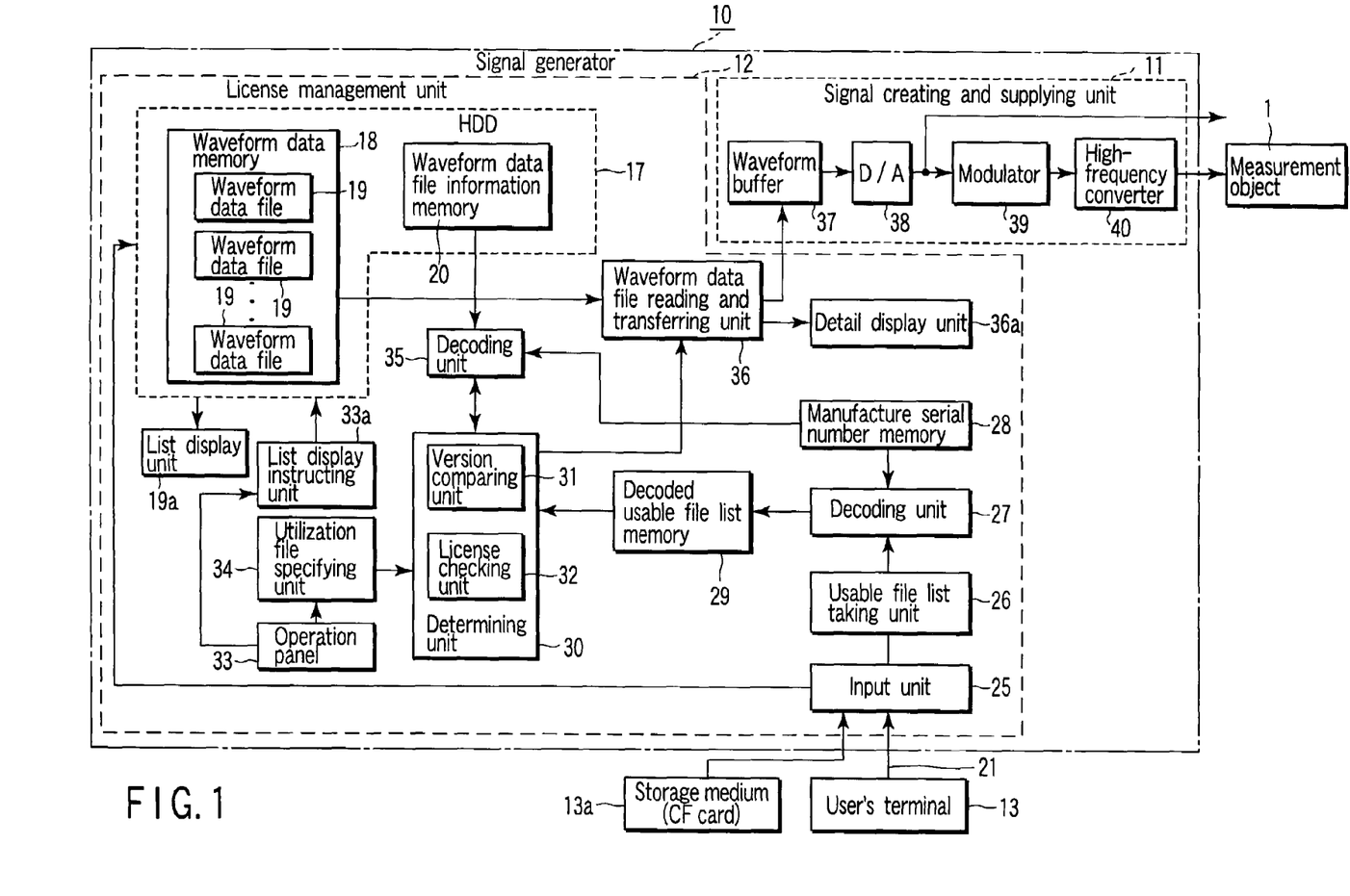
FIG. 1 is a block diagram showing a schematic structure of a signal generator having a license management function according to a first embodiment of the invention.

FIG. 1 is a block diagram showing a schematic structure of a signal generator having a license management function according to a first embodiment of the invention.

In FIG. 1, the same reference numerals are attached to the same components as in FIG. 9 and detailed description of the overlap is omitted.

As illustrated in FIG. 1, a signal generator having a license management function according to the invention basically includes a signal creating and supplying unit 11 which creates a test signal to be transmitted to a measurement object 1 and a license management unit 12 which manages a license of the waveform data for use in creating the test signal in the signal creating and supplying unit 11. The license management unit 12 includes a waveform data memory 18 which stores a plurality of waveform data files 19 into which a plurality of waveform data for various tests is written, a usable file list taking unit 26 which takes a usable file list 21 for specifying a usable waveform data file authenticated for this signal generator, the usable file list being input from an outside section, a usable file list memory 29 which stores the usable file list 21 taken by the usable file list taking unit 26, a utilization file specifying unit 34 which specifies a desired waveform data file from the waveform data files 19 stored in the waveform data memory 18, a determining unit 30 which determines whether the desired waveform data file specified by the utilization file specifying unit 34 is included in the usable file list stored in the usable file list memory 29, and a waveform data file reading and transferring unit 36 which reads a specified waveform data file 19 from the waveform data memory 18 and transfers the specified waveform data file to the signal creating and supplying unit 11 when the determining unit 30 determines that the desired waveform data file is included in the usable file list memory 29. The signal creating and supplying unit 11 creates a predetermined test signal according to the waveform data read from the specified waveform data file 19 transferred by the waveform data file reading and transferring unit 36 and transmits the predetermined test signal to the measurement object 1.

Namely, the signal generator 10 roughly comprises the signal creating and supplying unit 11 of a test signal which transmits the test signal to the measurement object 1 and the license management unit 12 which manages a license of the waveform data of the test signal as a waveform data managing device.

Here, depending on necessity, the license management unit 12 has an input unit 25 which receives the usable file list 21 from a user's terminal 13 of a user who uses the signal generator 10, or a storage medium 13a such as a compact flash (CF) card and the like.

Figure 4:
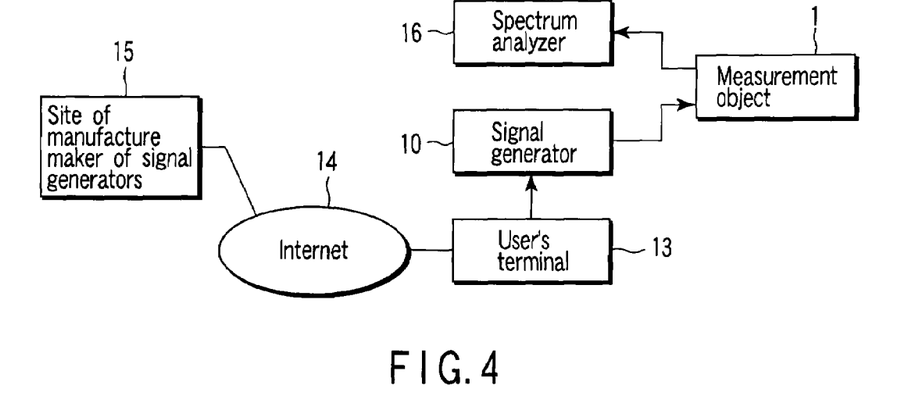
FIG. 4 is a view showing a connection state of the signal generator of FIG. 1 and an outside network.

The user's terminal 13 is connected to a site 15 of a manufacture maker of signal generators through the Internet 14, as illustrated in FIG. 4.

Depending on necessity, a spectrum analyzer 16 that is another measuring instrument is connected to the measurement object 1.

A waveform data memory 18 which stores a plurality of waveform data files 19 and a waveform data file information memory 20 are stored within a hard disk drive (HDD) 17 of the license management unit 12 in the signal generator 10 of FIG. 1.

The waveform data to create the waveform of a measurement signal to transmit to the measurement object 1 in every measurement condition by the signal creating and supplying unit 11 is written in each of the plurality of waveform data files 19.

More specifically, the waveform data of I and Q data format before modulation is written therein as a test signal in the case where the measurement object 1 is a digital communication instrument and a test of the receiving sensitivity is performed.

When a test of Reference Measurement channels is executed in a mobile cellular phone of the W-CDMA scheme, of the digital communication instruments, as the measurement object 1, various kinds of test parameters and the like including the information bit rate, for example, 12.2 kbps, 64 kbps, 144 kbps and the like, which are standardized by the above-mentioned non-patent document 1 are written in the respective waveform data files 19 as the waveform data.

Figure 2:
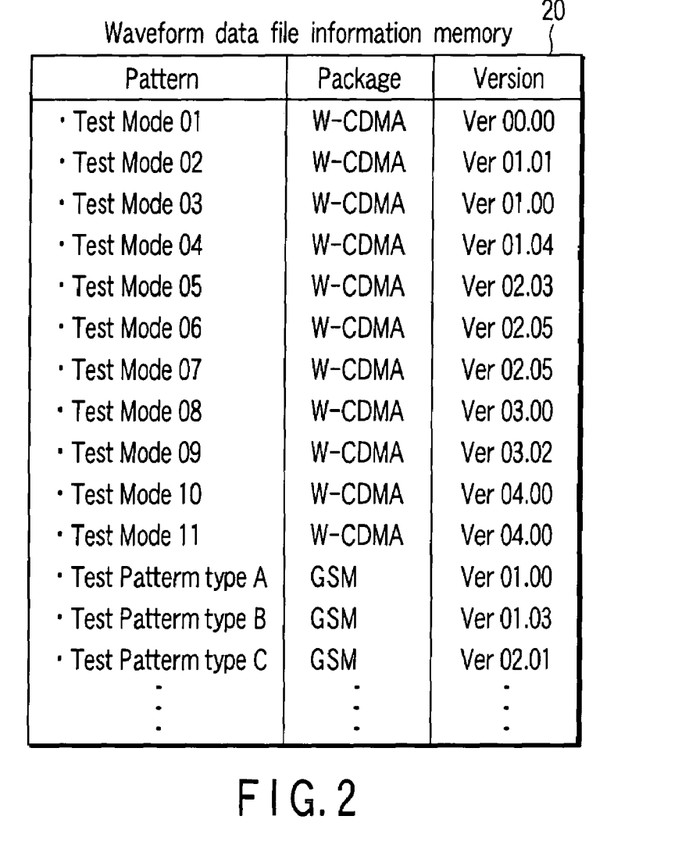
FIG. 2 is a view showing a storing contents of a waveform data file information memory built into the signal generator of FIG. 1.

The waveform data file information including "pattern", "package", and "version", as illustrated in FIG. 2, which specify the respective waveform data files 19 stored in the waveform data memory 18 is stored within the waveform data file information memory 20.

Among them, the "pattern" (Test Mode 01-Test Mode 11, Test pattern type A-Test Pattern type C) and the "package" (W-CDMA, GSM) specify each type of the respective waveform data files 19.

Further, the "version" (Ver 00.00-Ver 02.01) shows the revision number of the corresponding waveform data file 19 and the greater number of this version value shows the newer waveform data file 19.

In FIG. 2, the version (Ver 00.00) shows the waveform data file 19 for test and that a user is authenticated to use it without charge.

The waveform data file information each including the "pattern", "package", and "version" within the waveform data file information memory 20 shown in FIG. 2, is written, actually being encoded by means of ciphering to be used the inherent information in this signal generator 10, for example, the manufacture serial number of the signal generator 10.

In the signal generator 10 of this first embodiment, the respective waveform data files 19 within the waveform data memory 18 and the respective waveform data file information encoded by means of ciphering within the waveform data file information memory 20 are delivered to each user without charge in a state of being written in the HDD 17 by the manufacture maker of this signal generator 10.

Figure 3:
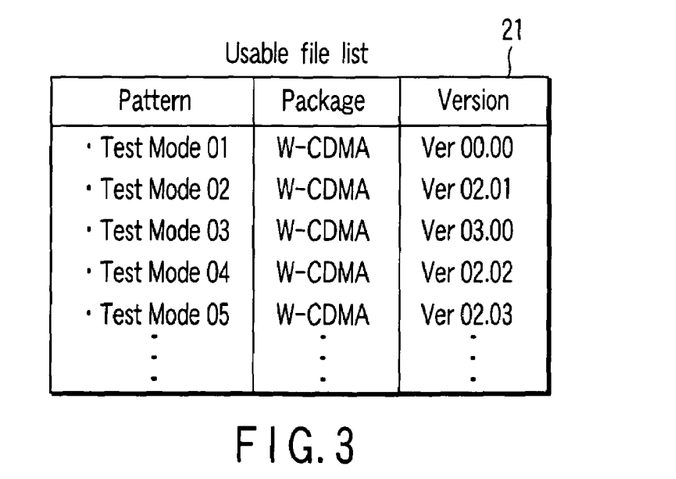
FIG. 3 is a view showing a usable file list to be input into the signal generator of FIG. 1.

FIG. 3 is a view showing the structure of the usable file list 21 input to the license management unit 12 from the user's terminal 13 or the storage medium 13a such as a CF card.

The waveform data file information of the "pattern", "package", and "version" which specify the usable waveform data files 19 authenticated by the manufacture maker of the signal generator 10 is included in the usable file list 21 of the signal generator 10.

The waveform data file information including the "pattern", "package", and "version" within the usable data file list 21 shown in FIG. 3 is built in, actually being encoded by using the inherent information in this signal generator 10, for example, the manufacture serial number of the signal generator 10.

This usable file list 21 is created by the manufacture maker of this signal generator 10 and transferred to the user's terminal 13 through the Internet 14 or input into the input unit 25 of the license management unit 12 from the storage medium 13a such as the CF card.

Figure 5:
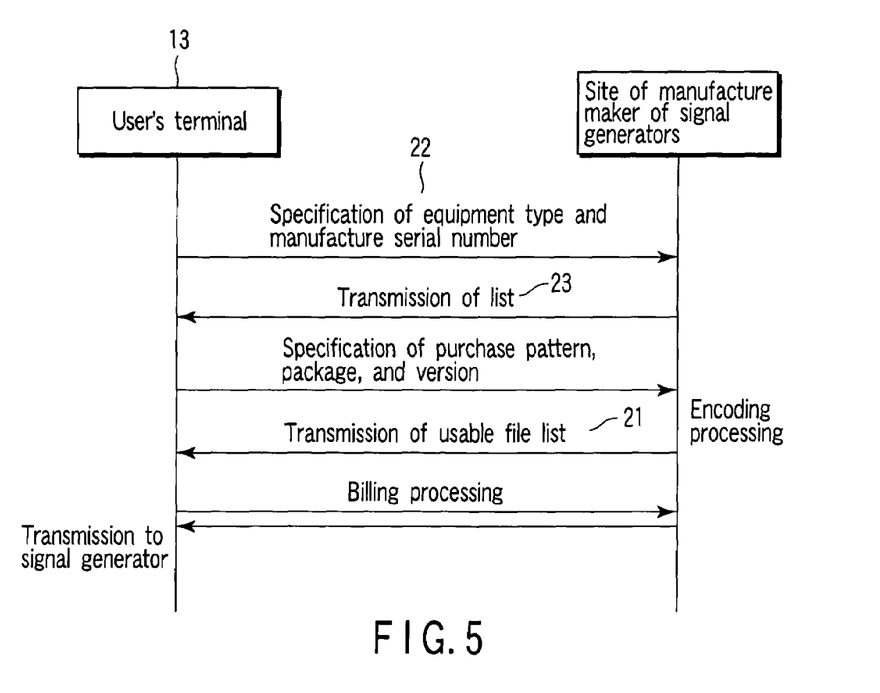
FIG. 5 is a sequence view showing an information exchange between a user's terminal and a site of measuring device maker in the network of FIG. 4.

FIG. 5 is a sequence view showing the information exchange between the user's terminal 13 and the site 15 of the manufacture maker of signal generators.

Figure 6A:
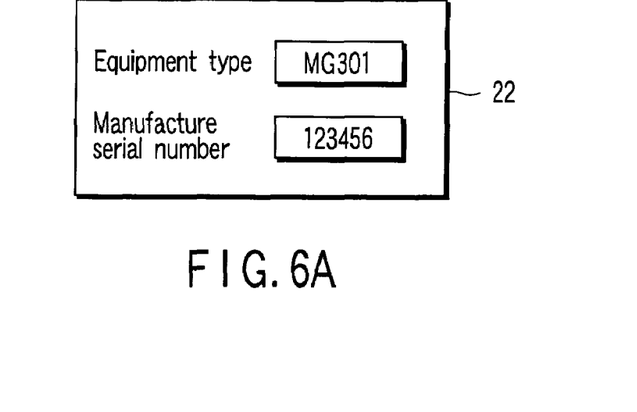
FIG. 6A is a view showing a format of various information transferred between the user's terminal and the site of measuring device maker in the network of FIG. 4.

A user of the signal generator 10 gains access to a web page of the site 15 of the manufacture maker of signal generators through the Internet 14 by operation of his or her own user's terminal 13 and transmits the inherent information in this signal generator 10, for example, an equipment type (model name) and a manufacture serial number 22 of the signal generator 10 to the site 15 of the manufacture maker of signal generators, as illustrated in FIG. 6A.

Figure 6B:
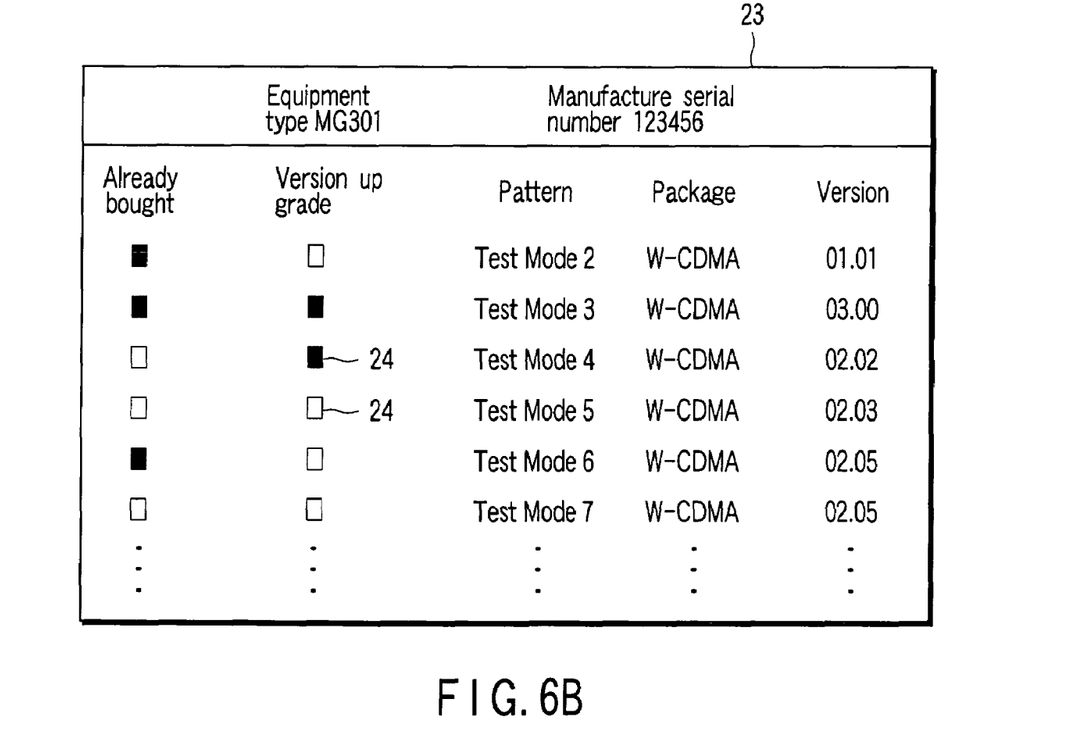
FIG. 6B is a view showing the format of various information transferred between the user's terminal and the site of measuring device maker in the network of FIG. 4.

The site 15 of the manufacture maker of signal generators transmits a list 23 as shown in FIG. 6B of all the waveform data files 19 usable in the equipment type of the signal generator 10 having been received, to the user's terminal 13.

This list 23 includes the information about whether the corresponding user has already bought the file or not and a selection button 24 of purchase or version upgrade, in every waveform data file information which specifies the waveform data file 19 of the "pattern", "package", and "version".

The user's terminal 13 received this list 23 displays the list 23 on its display unit (not illustrated).

The user clicks the selection button 24 of the "pattern", "package", and "version" they want to buy in a displayed list 23 and returns this list 23 to the site 15 of the manufacture maker of signal generators.

The site 15 of the manufacture maker of signal generators encodes a received waveform data file information of the "pattern", "package", and "version" purchased in a received list 23 with the inherent information in the corresponding signal generator 10 having been previously received, for example, the manufacture serial number of the corresponding signal generator 10, embeds a encoded waveform data file information in the usable file list 21 shown in FIG. 3, and transmits it to the user's terminal 13.

Thereafter, billing processing of a purchased (or sold) waveform data file 19 is performed between the user's terminal 13 and the site 15 of the manufacture maker of signal generators.

The user's terminal 13 transmits a received and encoded usable file list 21 to the license management unit 12 of the signal generator 10 upon completion of the billing processing.

In the license management unit 12 of FIG. 1, the usable file list taking unit 26 transmits a encoded usable file list 21 input through the input unit 25 from the user's terminal 13 or the storage medium 13a such as a CF card, to a decoding unit 27.

The decoding unit 27 decodes this received and encoded usable file list 21 by using the inherent information in this signal generator 10, for example, the inherent information in the corresponding signal generator 10 stored in a manufacture serial number memory 28 of the same signal generator 10, for example, the manufacture serial number of the same signal generator 10, and writes it into a decoded usable file list memory 29 as the usable file list memory.

When the user (operator) of this signal generator 10 inputs the "pattern" and "package" of the waveform data file 19 that he or she wishes to use, of the several waveform data files 19 stored in the waveform data memory 18, through an operation panel 33, the utilization file specifying unit 34 transmits the "pattern" and "package" of the waveform data file 19 input and specified by means of the operation panel 33, to the determining unit 30.

At this time, when the user (operator) of the signal generator 10 inputs the list of the titles of the several waveform data files 19 stored in the waveform data memory 18 through the operation panel 33, a list display instructing unit 33a directs the waveform data memory 18 to display the list of the titles of the several waveform data files 19 stored in the waveform data memory 18, and as a result, the titles of the several waveform data files 19 stored in the waveform data memory 18 are displayed on a list display unit 19a in the form of, for example, a list as shown in FIG. 2.

Accordingly, the user (operator) of the signal generator 10 can refer to the titles of the several waveform data files 19 stored in the waveform data memory 18, listed on the list display unit 19a, when specifying and inputting the waveform data file 19 that he or she wishes to use, of the several waveform data files 19 stored in the above waveform data memory 18.

The determining unit 30 activates a decoding unit 35 upon receipt of the "pattern" and "package" of the desired waveform data file 19.

The decoding unit 35 decodes the waveform data file information including the "pattern", "package", and "version" within the waveform data file information memory 20 stored into the HDD 17 as shown in FIG. 2, by using the manufacture serial number of the signal generator 10 stored in the manufacture serial number memory 28 and transmits it to the determining unit 30.

The "pattern" and "package" of the waveform data file information specified by means of the operation panel 33 is extracted from all the "patterns" and "packages" of the waveform data file information in the waveform data file information memory 20, and in order to check whether or not this specified "pattern" and "package" of the waveform data file information is stored (registered) in the usable file list 21 of the decoded usable file list memory 29, a version comparing unit 31 and a license checking unit 32 are built in the determining unit 30.

Namely, when the license checking unit 32 determines that the "pattern" and "package" of the specified waveform data file information has been stored (registered) in the decoded usable file list memory 29, the version comparing unit 31 is then activated to read the "pattern", "package", and "version" of the specified waveform data file information from the waveform data file information memory 20 and the decoding unit 35 decodes them.

The version comparing unit 31 compares the "version" read from the waveform data file information memory 20 and decoded by the decoding unit 35 with the "version" of the usable "pattern" and "package" waveform data file stored (registered) in the decoded usable file list memory 29.

When the "version" of the specified waveform data file is equal to or smaller than the "version" of the waveform data file of the usable file list, the license checking unit 32 determines that the specified waveform data file is usable and transmits the information of the specified waveform data file to the waveform data file reading and transferring unit 36.

When the "version" of the specified waveform data file is (Ver 00.00), since a user is allowed to use it without charge because it is a trial waveform data file 19, the information of the specified waveform data file is promptly transferred to the waveform data file reading and transferring unit 36 without searching the usable file list memory 29.

The waveform data file reading and transferring unit 36 reads the waveform data file 19 specified by the waveform data file information, from the waveform data memory 18 and writes it in a waveform buffer 37 of the signal creating and supplying unit 11.

At this time, since a detail display unit 36a is to display the detailed information (for example, various test parameters and the like including the information bit rate such as 12.2 kbps, 64 kbps, 144 kbps, etc. as standardized by the above-mentioned non-patent document 1) of the waveform data file 19 read from the waveform data memory 18, it is possible for a user of the signal generator 10 to perform various works more efficiently.

The waveform data of the waveform data file 19 written into the waveform buffer 37 of the signal creating and supplying unit 11 is sequentially read out, converted into analog waveform data by a digital-to-analog converter 38, and transmitted to a next modulator 39.

The modulator 39, for example, phase-modulates the input analog waveform data and transmits the same to a high-frequency converter 40.

The high-frequency converter 40 converts the frequency of the input modulation signal, for example, into a high frequency of GHz, and transmits the same to the measurement object 1 as a test signal.

At this time, there is also the case of transmitting the analog waveform data converted by the digital-to-analog converter 38, to the measurement object 1.

Figure 7:
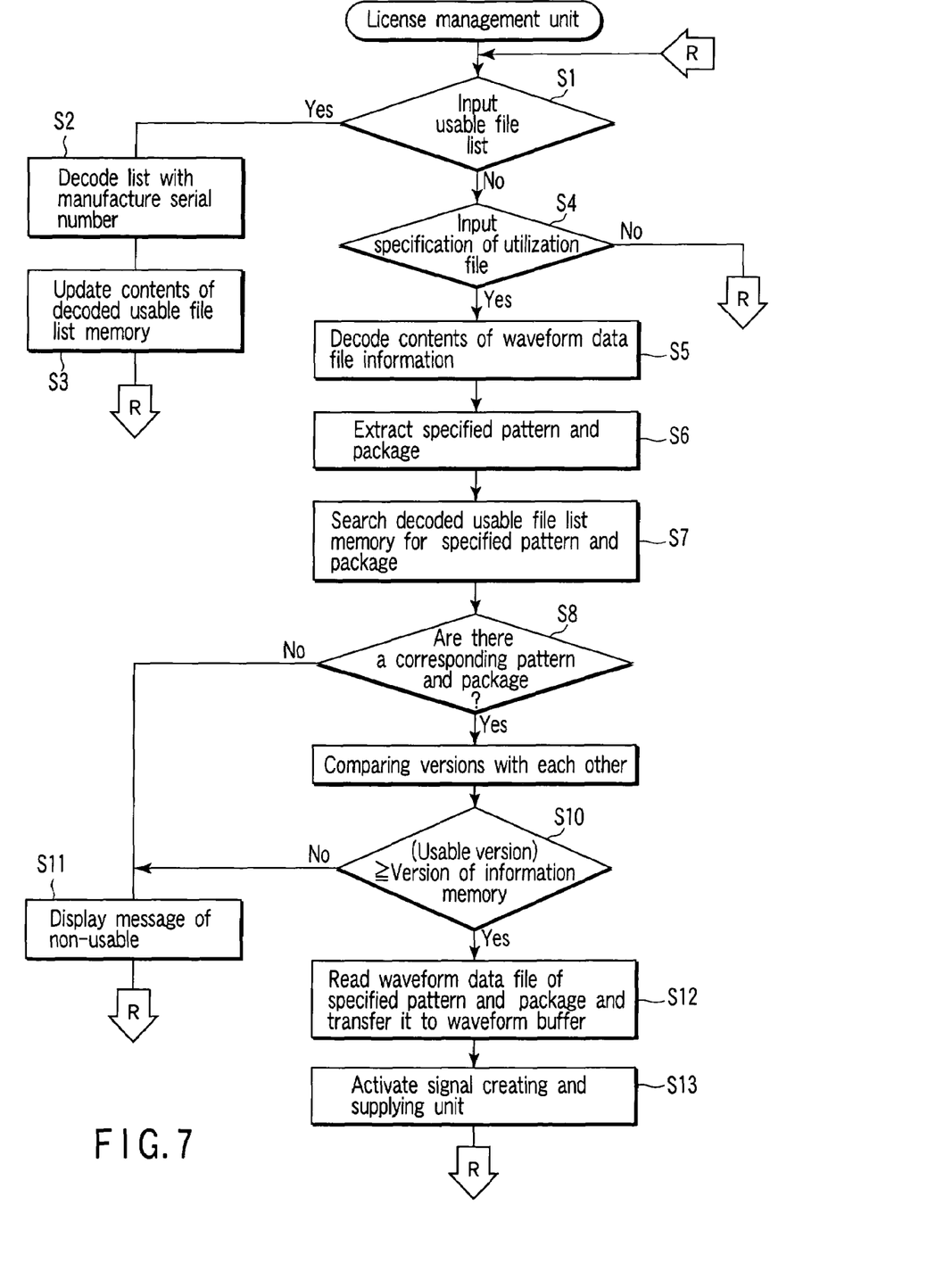
FIG. 7 is a flowchart showing the whole operation of the signal generator of FIG. 1.

The whole operation of the license management unit 12 of the signal generator 10 thus constituted will be described by using the flowchart shown in FIG. 7.

At first, upon receipt of the encoded usable file list 21 shown in FIG. 3 from the user's terminal 13 or the storage medium 13a such as the CF card (Step S1), the decoding unit 27 is activated, so as to decode the usable waveform data file information of the usable file list 21 by using the inherent information in this signal generator 10, for example, the manufacture serial number of this signal generator 10 (Step S2).

The contents of the decoded usable file list memory 29 are updated with this usable waveform data file information having been decoded (Step S3).

Upon receipt of the specification of the utilization waveform data file from the operation panel 33 (Step S4), the decoding unit 35 decodes the waveform data file information stored in the waveform data file information memory 20 (Step S5).

When the determining unit 30 extracts the "pattern" and "package" of the waveform data file information specified from the decoded waveform data file information (Step S6), the decoded usable file list memory 29 is searched for this extracted (specified) "pattern" and "package" (Step S7).

When it is found that the waveform data file information of the corresponding "pattern" and "package" is stored within the decoded usable file list memory 29 (Step S8), the version comparing unit 31 compares the both "versions" of the waveform data file information with each other (Step S9).

In this "version" comparison, when the "version" of the waveform data file information of the usable file list memory 29 is equal to or more than the "version" of the specified waveform data file information (Step S10), the waveform data file reading and transferring unit 36 is activated, so as to read the waveform data file 19 specified by the waveform data file information specified by the "pattern" and "package" from the waveform data memory 18 and to write it into the waveform buffer 37 of the signal creating and supplying unit 11 (Step S12), and thereafter, the signal creating and supplying unit 11 is activated (Step S13).

When the waveform data file information of the corresponding "pattern" and "package" is not stored within the decoded usable file list memory 29 in Step S8, or when the "version" of the waveform data file information of the usable file list memory 29 is smaller than the "version" of the specified waveform data file information in Step S10, a message to the effect that the specified waveform data file cannot be used is displayed on the display unit (not illustrated) of the operation panel 33 (Step S11).

In the signal generator having the license management function of the first embodiment thus constituted, a plurality of waveform data files 19 including the waveform data to create the waveform of a measurement signal to be transmitted to the measurement object 1 in every measurement condition by the signal creating and supplying unit 11 is stored in the waveform data memory 18 within the HDD 17 in the license management unit 12 of the signal generator 10.

The waveform data files 19 in the waveform data memory 18 are delivered to each user in a state of being written in the HDD 17 by the manufacture maker of the signal generator 10 without charge.

The manufacture maker of signal generators selling this signal generator 10 provides the usable file list 21 which specifies a usable waveform data file 19 for the corresponding signal generator 10, to the user of each signal generator 10 with charge, through the user's terminal 13 of every user of the signal generators 10 over the Internet 14 or the storage medium 13a such as the CF card.

The user of each signal generator 10 inputs the usable file list 21 provided with charge into their corresponding signal generator 10.

Thereafter, when the user specifies an operation in their desired waveform data file, when the specified waveform data file is included in the usable file list 21 and its "version" is equal to or smaller than the "version" of the usable file list, the desired waveform data file 19 is read from the waveform data memory 18 and transferred to the test signal creating and supplying unit 11.

As a result, a predetermined test signal having the waveform by using the waveform data of the waveform data file 19 that the user desires to use is transmitted from the signal generator 10 to the measurement object 1.

Thus, the waveform data file 19 written into the waveform data memory 18 of each of the signal generator 10 without charge will not be read unless it is included in the usable file list 21 provided with charge to the corresponding signal generator 10. Therefore, the manufacture maker of signal generators selling this signal generator 10 can surely conduct the license management about the respective waveform data files 19.

Further, since the usable file list 21 provided to the user's terminal 13 of the user through the Internet 14 or provided through the storage medium 13a such as the CF card from the manufacture maker of signal generators 10 with charge is encoded by using the inherent information in the signal generator 10 of the user of provision destination, for example, the manufacture serial number of the corresponding signal generator 10, this usable file list 21 can be decoded by using the inherent information in this signal generator 10, for example, the manufacture serial number of this signal generator 10, only when it is input into the signal generator 10 of the above user of provision destination.

Therefore, even when this usable file list 21 is input into another signal generator 10, it cannot be decoded, and therefore, the security of the usable file list 21 can be much improved.

Accordingly, the manufacture maker of signal generators selling this signal generator 10 can perform the license management of the waveform data files 19 more strictly.

Further, each of the waveform data files 19 in the waveform data memory 18 and each of the usable waveform data files in the usable file list 21 are provided with "version", which enables the version management of the respective waveform data files, thereby surely conducting the license management of the respective waveform data files 19 including the version management.

The license management method of the signal generator according to the invention basically has a step for preparing a signal creating and supplying unit 11 which creates a test signal to be transmitted to the measurement object 1 and a step for managing the license of the waveform data for use in creating the test signal in the signal creating and supplying unit 11. The managing step includes a step for storing into a waveform data memory 18 a plurality of waveform data files 19 into which a plurality of waveform data for various tests is written, a step for taking a usable file list which specifies a usable waveform data file 19 authenticated for the signal generator, a step for storing the usable file list taken through the above taking step into the usable file list memory 29, a step for specifying a desired waveform data file from the waveform data files 19 stored in the waveform data memory 18, a step for determining whether the desired waveform data file specified by the above specifying step is included in the usable file list stored in the usable file list memory 29, and a step for reading a specified waveform data file 19 from the waveform data memory 18 and transferring it to the signal creating and supplying unit 11 when it is determined that the desired waveform data file is included in the usable file list memory 29 in the determining step, wherein the signal creating and supplying unit 11 creates a predetermined test signal according to the waveform data read from the waveform data file 19 transferred by the above transferring step and transmits it to the measurement object 1.

Second Embodiment

A signal generator having a license management function according to a second embodiment is to have a function of downloading a waveform data file 19 from a site 15 of the manufacture maker of signal generators through the Internet 14 in addition to that of the first embodiment shown in FIGS. 1 to 7.

Figure 8:
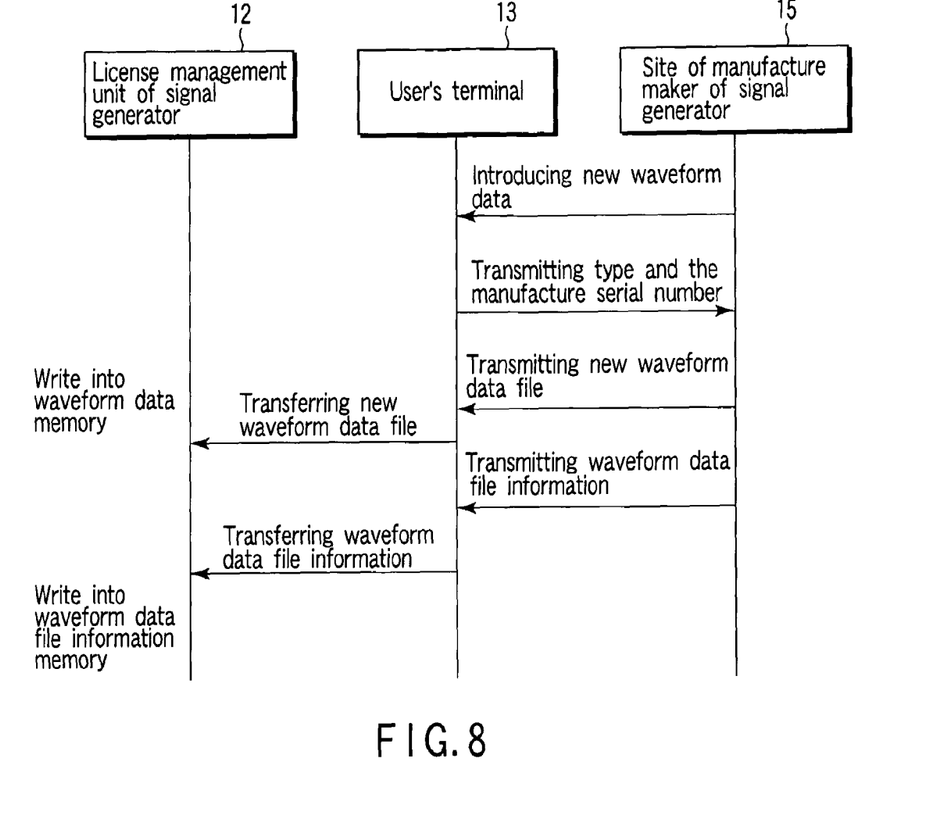
FIG. 8 is a sequence view showing an information exchange among the signal generator according to the second embodiment of the invention, the user's terminal in the outside network, the site of measuring device maker, and a license management unit.

FIG. 8 is a sequence view showing the information exchange between a user's terminal 13 in the signal generator having the license management function according to the second embodiment, the site 15 of the manufacture maker of signal generators, and a license management unit 12 of a signal generator 10.

The site 15 of the manufacture maker of signal generators transmits the introduction of a new waveform data file to the user's terminal 13 through the Internet 14.

When the user finds the introduction of the new waveform data file from the site 15 of the manufacture maker of signal generators on the display screen of the user's terminal 13, he or she transmits the type of their signal generator 10 and the inherent information in the signal generator 10, for example, the manufacture serial number of this signal generator 10, to the site 15 of the manufacture maker of signal generators.

The site 15 of the manufacture maker of signal generators transmits the new waveform data file 19 to the corresponding user's terminal 13 through the Internet 14.

The user's terminal 13 transfers a received new waveform data file 19 to the license management unit 12 of the signal generator 10.

Upon receipt of the new waveform data file 19, the license management unit 12 additionally writes this received new waveform data file 19 in the waveform data memory 18.

After transmitting the new waveform data file 19 to the user's terminal 13, the site 15 of the manufacture maker of signal generators encodes the new waveform data file information including the "pattern", "package", and "version" which specify a transmitted new waveform data file 19 with the inherent information in the signal generator 10 having been previously received, for example, the manufacture serial number of the corresponding signal generator 10, and transmits the same to the user's terminal 13 through the Internet 14.

Upon receipt of an encoded new waveform data file information, the user's terminal 13 transfers this encoded new waveform data file information to the license management unit 12 of the signal generator 10.

Upon receipt of the new waveform data file information, the license management unit 12 additionally writes this received and encoded new waveform data file information in a waveform data file information memory 20.

In the signal generator having the license management function according to the second embodiment thus constituted, the encoded usable file list 21, the waveform data files 19, and the encoded waveform data file information are downloaded from the site 15 of the manufacture maker of signal generators to the license management unit 12 of the signal generator 10 through the network 14 and the user's terminal 13, thereby enabling the manufacture maker of signal generators and the user of the signal generator to perform various kinds of services most efficiently.

This invention is not restricted to the above embodiments. For example, although the above embodiments show the signal generator 10 simply, it is not restricted to the simple signal generator 10, but needless to say, it may be any measuring device having a function of a signal generator capable of transmitting a test signal to the measurement object 1.

As mentioned above, by providing the signal generator itself with a license management function, this invention can provide the signal generator having the license management function and its license management method capable of surely conducting the license agreement as for the respective signal generators, decreasing the operational burden on an operator, and surely conducting the license management of the waveform data.

The invention claimed is:

1. A signal generator which has a license management function, and which is configured to transmit a modulation signal as a test signal to a measurement object corresponding to a digital communication equipment in a mobile communication system, the signal generator comprising:
   a signal creating and supplying unit which is configured to create the test signal to be transmitted to the measurement object; and
   a license management unit which is configured to manage a license of waveform data used in creating the test signal by the signal creating and supplying unit, wherein the license management unit comprises:
      a waveform data memory that stores a plurality of waveform data files into which a plurality of waveform data for various tests is written;
      a waveform data file information memory which stores wave data file information specifying the plurality of waveform data files stored in the waveform data memory;
      a usable file list taking unit which is configured to take a usable file list that specifies a usable waveform data file authenticated for the signal generator, wherein the usable file list is input from an outside section;
      a usable file list memory which is configured to store the usable file list taken by the usable file list taking unit;
      a utilization file specifying unit which is configured to specify a desired waveform data file from the plurality of waveform data files stored in the waveform data memory;
      a determining unit which utilizes the usable file list stored in the usable file list memory and the wave data file information stored in the waveform data file information memory to determine whether or not the desired waveform data file specified by the utilization file specifying unit is included in the usable file list stored in the usable file list memory; and
      a waveform data file reading and transferring unit which reads the specified waveform data file from the waveform data memory and transfers the file to the signal creating and supplying unit when the determining unit determines that the desired waveform data file is included in the usable file list memory, and
   wherein:
      the signal creating and supplying unit is configured to create a predetermined test signal according to the waveform data read from the specified waveform data file transferred by the waveform data file reading and transferring unit and transmit the predetermined test signal to the measurement object, the usable file list taken by the usable file list taking unit and the wave data file information stored in the waveform data file information memory have been encoded previously with inherent information in the signal generator, the signal generator further comprises a first decoding unit which is configured to decode an encoded usable file list by using the inherent information in the signal generator and write a decoded usable file list in the usable file list memory, and a second decoding unit which is configured to decode an encoded wave data file information by using the inherent information in the signal generator and transmit a decoded wave data file information to the determining unit, wherein the inherent information in the signal generator comprises a manufacture serial number of the signal generator, and the signal generator further comprises a manufacture serial number memory which stores the manufacture serial number of the signal generator, and wherein the first decoding unit is configured to decode the encoded usable file list by using the manufacture serial number of the signal generator read from the manufacture serial number memory, and the second decoding unit is configured to decode the encoded wave data file information by using the manufacture serial number of the signal generator read from the manufacture serial number memory.

2. The signal generator having the license management function according to claim 1, wherein:

each of the plurality of waveform data files stored in the waveform data memory has a version, a usable version is registered in the usable file list stored into the usable file list memory according to the usable waveform data file authenticated for the signal generator, and when the version of the specified waveform data file specified by the utilization file specifying unit is equal to or smaller than the usable version for the same waveform data file registered in the usable file list, the determining unit determines that the specified waveform data file is included in the usable file list stored in the usable file list memory.

3. The signal generator having the license management function according to claim 1, wherein the encoded usable file list is downloadable with a charge into the signal generator from a site of a manufacturer of signal generators through a network.

4. The signal generator having the license management function according to claim 1, wherein the encoded usable file list is downloadable with a charge into the signal generator through a storage medium provided by a manufacturer of signal generators.

5. The signal generator having the license management function according to claim 1, wherein a given waveform data file for storing in the waveform data memory is downloadable free of charge from a site of a manufacturer of signal generators through a network.

6. The signal generator having the license management function according to claim 1, further comprising:

a detail display unit which is configured to display detailed information of the waveform data read from the waveform data file transferred by the waveform data file reading and transferring unit, and wherein the measurement object corresponds to a mobile phone for a W-CDMA system, and the detailed information includes a bit rate.

7. The signal generator having the license management function according to claim 1, further comprising:

a list display instructing unit for instructing a list display of titles of the waveform data files stored in the waveform data memory; and a list display unit which displays a list of the tiles of the waveform data files stored in the waveform data memory, in response to an instruction by the list display instructing unit.

8. The signal generator having the license management function according to claim 1, wherein at least one of a W-CDMA transmission test data package and a GSM transmission test data package is included in the waveform data files stored in the waveform data memory.

9. A license management method of a signal generator which is configured to transmit a modulation signal as a test signal to a measurement object corresponding to a digital communication equipment in a mobile communication system, the method comprising:

preparing a signal creating and supplying unit which is configured to create the test signal to be transmitted to the measurement object; and managing a license of waveform data used in creating the test signal by the signal creating and supplying unit, wherein the managing comprises:

storing in a waveform data memory, a plurality of waveform data files into which a plurality of waveform data for various tests is written;

storing in a waveform data file information memory, wave data file information specifying the plurality of waveform data files stored in the waveform data memory;

taking a usable file list which specifies a usable waveform data file authenticated for the signal generator;

storing the taken usable file list in a usable file list memory;

specifying a desired waveform data file from the plurality of waveform data files stored in the waveform data memory;

utilizing the usable file list stored in the usable file list memory and the wave data file information stored in the waveform data file information memory to determine whether or not the specified desired waveform data file is included in the usable file list stored in the usable file list memory; and reading the specified waveform data file from the waveform data memory and transferring the specified waveform data file to the signal creating and supplying unit when it is determined that the specified desired waveform data file is included in the usable file list memory, and wherein:

the signal creating and supplying unit is configured to create a predetermined test signal according to the waveform data read from the transferred waveform data file and transmit the predetermined test signal to the measurement object, the taken usable file list and the wave data file information stored in the waveform data file information memory have been encoded previously with inherent information in the signal generator, the method further comprises decoding an encoded usable file list with the inherent information in the signal generator and writing a decoded usable file list in the usable file list memory, and decoding an encoded wave data file information with the inherent information in the signal generator and transmitting a decoded wave data file information for determining whether the specified desired waveform data file is included in the usable file list, wherein the inherent information in the signal generator is a manufacture serial number of the signal generator, the method further comprises storing the manufacture serial number of the signal generator in a manufacture serial number memory, and wherein the encoded usable file list and the encoded wave data file information are decoded by using the manufacture serial number of the signal generator read from the manufacture serial number memory.

10. The license management method of the signal generator according to claim 9, wherein:

each of the plurality of waveform data files stored in the waveform data memory has a version, a usable version is registered in the usable file list stored in the usable file list memory according to the usable waveform data file authenticated for the signal generator, and when the version of the specified waveform data file is equal to or smaller than the usable version for the same waveform data file registered by the usable file list, it is determined that the specified waveform data file is included in the usable file list stored in the usable file list memory.

11. The license management method of the signal generator according to claim 9, wherein the encoded usable file list is downloadable with a charge into the signal generator from a site of a manufacturer of signal generators through a network.

12. The license management method of the signal generator according to claim 9, wherein the encoded usable file list is downloadable with a charge into the signal generator through a storage medium provided by a manufacturer of signal generators.

13. The license management method of the signal generator according to claim 9, wherein a given waveform data file for storing in the waveform data memory is downloadable free of charge from a site of a manufacturer of signal generators through a network.

14. The license management method of the signal generator according to claim 9, further comprising:

displaying detailed information of the waveform data read from the transferred waveform data file, wherein the measurement object corresponds to a mobile phone for a W-CDMA system, and the detailed information includes a bit rate.

15. The license management method of the signal generator according to claim 11, further comprising:

instructing a list display of titles of the waveform data files stored in the waveform data memory; and displaying a list of the tiles of the waveform data files stored in the waveform data memory, in response to an instruction of the list display.

16. The license management method of the signal generator according to claim 9, wherein at least one of a W-CDMA transmission test data package and a GSM transmission test data package is included in the waveform data files stored in the waveform data memory.

* * * * *